United States Patent
Morita

(10) Patent No.: US 10,070,382 B2
(45) Date of Patent: Sep. 4, 2018

(54) COMMUNICATION CONTROL METHOD AND BASE STATION

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 284 days.

(21) Appl. No.: 15/038,338

(22) PCT Filed: Nov. 21, 2014

(86) PCT No.: PCT/JP2014/080888
§ 371 (c)(1),
(2) Date: May 20, 2016

(87) PCT Pub. No.: WO2015/080040
PCT Pub. Date: Jun. 4, 2015

(65) Prior Publication Data
US 2016/0295505 A1    Oct. 6, 2016

(30) Foreign Application Priority Data

Nov. 26, 2013  (JP) ................. 2013-244258

(51) Int. Cl.
| | |
|---|---|
| H04W 36/30 | (2009.01) |
| H04W 52/02 | (2009.01) |
| H04W 16/08 | (2009.01) |
| H04W 24/02 | (2009.01) |
| H04W 36/16 | (2009.01) |

(Continued)

(52) U.S. Cl.
CPC ....... *H04W 52/0206* (2013.01); *H04W 16/08* (2013.01); *H04W 24/02* (2013.01);
(Continued)

(58) Field of Classification Search
CPC .................................................. H04W 36/30
See application file for complete search history.

(56) References Cited

U.S. PATENT DOCUMENTS

| | | |
|---|---|---|
| 2010/0210268 A1 | 8/2010 | Lim et al. |
| 2011/0319110 A1 | 12/2011 | Futaki |

(Continued)

FOREIGN PATENT DOCUMENTS

| | | |
|---|---|---|
| JP | 2012-518320 A | 8/2012 |
| WO | 2010/104143 A1 | 9/2010 |
| WO | 2011/158663 A1 | 12/2011 |

OTHER PUBLICATIONS

International Search Report issued in PCT/JP2014/080888; dated Jan. 13, 2015.

(Continued)

*Primary Examiner* — Frank Donado
(74) *Attorney, Agent, or Firm* — Studebaker & Brackett PC

(57) ABSTRACT

A communication control method comprises: a step A of requesting, by an off target base station, an extension target base station that manages a second cell to which a closed mode in which only a user terminal having an access right is accessible is settable to perform the cell extension; and a step B of transmitting, by the extension target base station, a response to the request based on a determination result as to whether or not a user terminal connected to the first cell is connectable to the second cell, to the off target base station.

10 Claims, 15 Drawing Sheets

(51) Int. Cl.
  *H04W 36/22* (2009.01)
  *H04W 88/08* (2009.01)

(52) U.S. Cl.
  CPC ..... *H04W 36/165* (2013.01); *H04W 52/0212* (2013.01); *H04W 36/22* (2013.01); *H04W 88/08* (2013.01); *Y02D 70/00* (2018.01); *Y02D 70/1262* (2018.01); *Y02D 70/164* (2018.01)

(56) References Cited

U.S. PATENT DOCUMENTS

2013/0142133 A1* 6/2013 Pedersen ............... H04W 16/10 370/329

2013/0237266 A1* 9/2013 Futaki ................... H04W 24/02 455/509

2016/0309536 A1* 10/2016 Maeda .................... H04L 5/001

OTHER PUBLICATIONS

Written Opinion issued in PCT/JP2014/080888; dated Jan. 13, 2015.

3rd Generation Partnership Project; 3rd Generation Partnership Project; Technical Specification Group Radio Access Network; Evolved Universal Terrestrial Radio Access (E-UTRA); Potential solutions for energy saving for E-UTRAN; 3GPP TR 36.927 V11.0.0; Sep. 2012; pp. 1-22; Release 11; 3GPP Organizational Partners.

* cited by examiner

COMMUNICATION CONTROL METHOD AND BASE STATION

TECHNICAL FIELD

The present invention relates to a communication control method and a base station used in a mobile communication system.

BACKGROUND ART

According to 3GPP (3rd Generation Partnership Project), which is a project aiming to standardize a mobile communication system, a technology for power saving (energy saving), which reduces the power consumption of a network, has been introduced (for example, see Non Patent Literature 1). For example, a cell managed by a base station is deactivated in the nighttime etc., when communication traffic is decreased.

Furthermore, according to the 3GPP, in Release 12 and later, an improved energy saving technology is proposed to be introduced. For example, when setting one cell to OFF, transmission power of an adjacent cell is increased. As a result, it is possible to extend a coverage of the adjacent cell (cell extension) and to compensate a coverage of a cell to be deactivated (OFF target cell) (area compensation).

Here, a case is assumed where an adjacent cell is a cell to which a closed mode in which only a user terminal having an access right is accessible is settable.

In such a case, there is a problem when the closed mode is set to a proximal cell, a user terminal having no access right is not connectable to the adjacent cell, and thus, even when an area compensation is performed by the cell extension, communication is not possible.

CITATION LIST

Patent Literature

[NPL 1] 3GPP Technical Report "TR 36.927 V11.0.0" September, 2012

SUMMARY OF INVENTION

A communication control method according to embodiments is used in a mobile communication system having an off target base station that intends to turn off a first cell that is an own cell of the off target base station and an extension target base station to perform cell extension for compensating the first cell. The method comprises a step A of requesting, by the off target base station, the extension target base station that manages a second cell to which a closed mode in which only a user terminal having an access right is accessible is settable to perform the cell extension; and a step B of transmitting, by the extension target base station, a response to the request based on a determination result as to whether or not a user terminal connected to the first cell is connectable to the second cell, to the off target base station.

DESCRIPTION OF EMBODIMENTS

Figure 1:
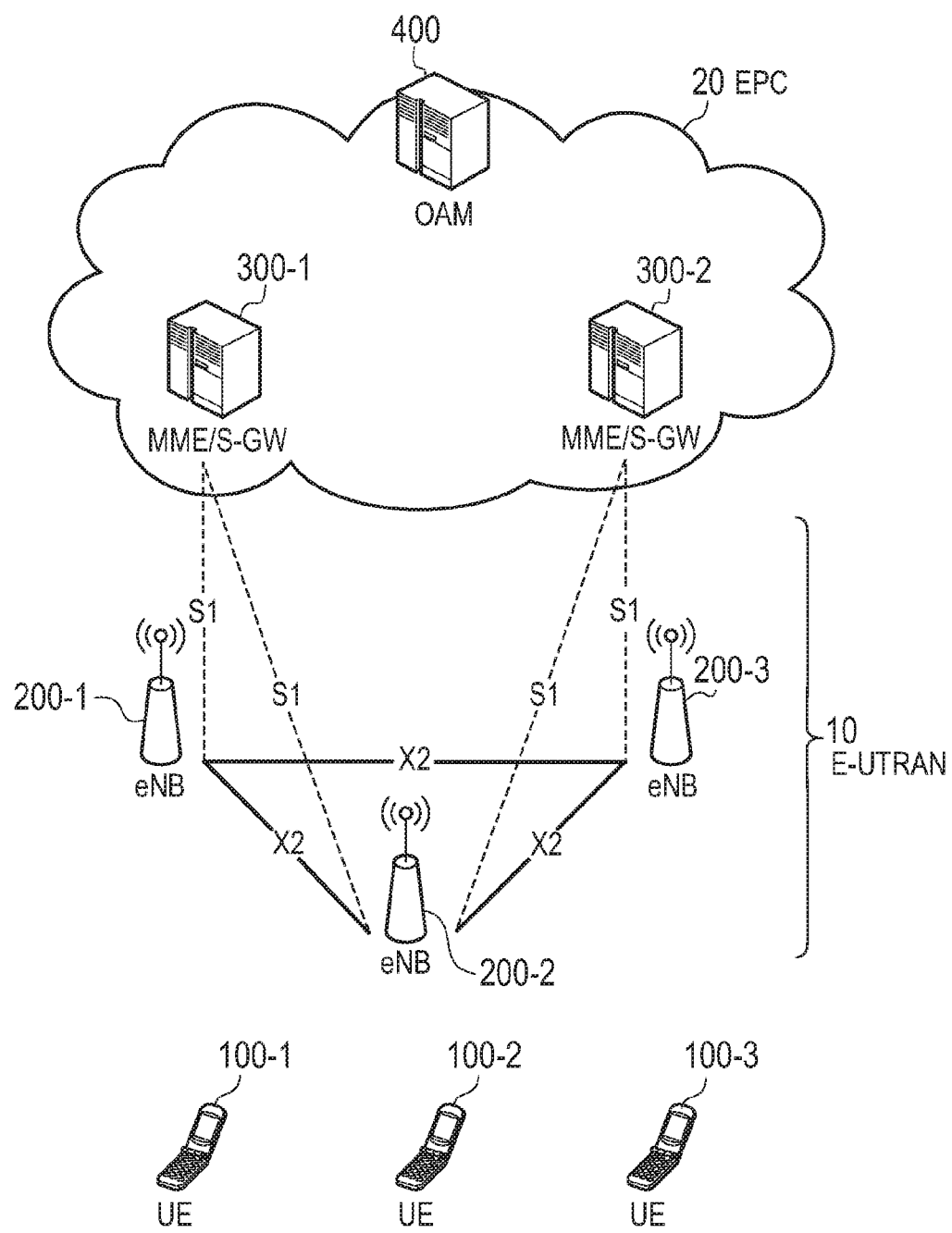
FIG. 1 is a configuration diagram of an LTE system.

A communication control method according to the embodiments is used in a mobile communication system having an off target base station that intends to turn off a first cell that is an own cell of the off target base station and an extension target base station to perform cell extension for compensating the first cell. The method comprises: a step A of requesting, by the off target base station, the extension target base station that manages a second cell to which a closed mode in which only a user terminal having an access right is accessible is settable to perform the cell extension; and a step B of transmitting, by the extension target base station, a response to the request based on a determination result as to whether or not a user terminal connected to the first cell is connectable to the second cell, to the off target base station.

In the embodiments, the communication control method further comprises a step of deciding, by the off target base station, on the basis of the response, whether or not to turn off the first cell.

In the embodiments, in the step B, the extension target base station transmits, when the closed mode is not set to the second cell, the response with an indication of approving the cell extension.

In the embodiments, the first cell is a cell to which the closed mode is settable. In the step A, the off target base station transmits the request including a CSG identifier of the first cell. In the step B, the extension target base station transmits, when the closed mode is set to the second cell and when a CSG identifier of the first cell and a CSG identifier of the second cell are the same, the response with an indication of approving the cell extension.

In the embodiments, in the step A, the off target base station transmits the request to each of a plurality of extension target base stations including the extension target base station. The method further comprises: a step of deciding to cause, by the off target base station, when receiving the response with an indication of approving the cell extension from each of two or more extension target base stations out of the plurality of extension target base stations, each of extension target base stations in a combination where a power consumption based on the cell extension is the smallest, out of the two or more extension target base stations to perform the cell extension.

In the embodiments, first cell is a cell to which the closed mode is settable. In the step A, the off target base station transmits the request including a CSG identifier of the first cell. The method further comprises: a step of transmitting, by the extension target base station, a CSG identifier of the first cell and a CSG identifier of the second cell to a network device, when the CSG identifier of the first cell and the CSG identifier of the second cell are different; and a step C of determining, by the network device, on the basis of the CSG identifier of the first cell and the CSG identifier of the second cell, whether or not the user terminal connected to the first cell is connectable to the second cell. In the step B, the extension target base station transmits, on the basis of a determination result in the step C, the response, to the off target base station.

In the embodiments, in the step C, when a CSG identifier of the second cell is set in a list in which a CSG identifier of a cell to which the user terminal has an access right is set, if a CSG identifier of the first cell is set, then the network device determines that the user terminal connected to the first cell is connectable to the second cell.

In the embodiments, in the step C, the network device determines, when determining that a set of user terminals having an access right to the first cell is a subset of a set of user terminals having an access right to the second cell, that the user terminal connected to the first cell is connectable to the second cell.

A base station (eNB200-1) according to the embodiments is a base station that corresponds to an off target base station in a mobile communication system having the off target base station that intends to turn off a first cell that is an own cell of the off target base station and an extension target base station to perform cell extension for compensating the first cell. The base station comprises: a transmitter configured to transmit request information to request, to the extension target base station that manages a second cell to which a closed mode in which only a user terminal having an access right is accessible is settable, to perform the cell extension; and a receiver configured to receive, from the extension target base station, a response to the request information based on a determination result as to whether or not the user terminal connected to the first cell is connectable to the second cell.

A base station (eNB200-2) that corresponds to an extension target base station in a mobile communication system having an off target base station that intends to turn off a first cell that is an own cell of the off target base station and the extension target base station to perform cell extension for compensating the first cell. The base station comprises: a controller configured to manage a second cell to which a closed mode in which only a user terminal having an access right is accessible is settable; a receiver configured to receive, from the off target base station, request information to request for performing the cell extension; and a transmitter configured to transmit, to the off target base station, a response to the request information based on a determination result as to whether or not the user terminal connected to the first cell is connectable to the second cell.

Embodiments (LTE System)

FIG. 1 is a configuration diagram of an LTE system according to the embodiments.

As illustrated in FIG. 1, the LTE system includes a plurality of UEs (User Equipment) 100, E-UTRAN (Evolved-Universal Terrestrial Radio Access Network) 10, and EPC (Evolved Packet Core) 20. The E-UTRAN 10 and the EPC 20 configure a network of the LTE system.

The UE 100 is a mobile radio communication device and performs radio communication with a cell (serving cell) with which a connection is established. The UE 100 corresponds to the user terminal.

The E-UTRAN 10 includes a plurality of eNBs 200 (evolved Node-B). The eNB 200 corresponds to a base station. Each eNB 200 manages cells and performs radio communication with the UE 100 which establishes a connection with the cell.

It is noted that the "cell" is used as a term indicating a minimum unit of a radio communication area, and is also used as a term indicating a function of performing radio communication with the UE 100.

The cell is called a "CSG (Closed Subscriber Group) cell", a "hybrid cell", or an "open cell" according to a set access mode.

The CSG cell is a cell accessible only by a UE 100 (called a "member UE") having an access right, and broadcasts a CSG ID. The UE 100 holds a list (white list: CSG white list) of the CSG ID of a CSG cell for which the UE 100 has an access right, and determines whether the UE 100 has the access right or not on the basis of the white list and the CSG ID broadcast by the CSG cell.

The hybrid cell is a cell in which a member UE is more advantageously treated as compared with a non-member UE, and broadcasts information indicating that the hybrid cell is a cell opened also to a non-member UE, in addition to the CSG ID. The UE 100 determines whether the UE 100 has the access right or not on the basis of the white list and the CSG ID broadcasted by the hybrid cell.

The open cell is a cell in which the UE 100 is equivalently treated regardless of whether or not the UE 100 is a member, and does not broadcast the CSG ID. In view of the UE 100, the open cell is identical to a general cell.

Further, the eNB 200 has a radio resource management (RRM) function, a routing function of user data, and a measurement control function for mobility control and scheduling, for example.

Further, the eNBs 200 are connected mutually via an X2 interface. Moreover, the eNB 200 is connected to an MME/S-GW 300 via an S1 interface.

It is noted that the eNB 200 may be a macro base station (Macro eNB) that manages one or a plurality of cells (large cell), and may be HeNB (Home evolved Node-B) that manages a specific cell (small cell) having a narrower cover range than the large cell. The HeNB is a small stationary radio communication device that is installable indoor.

The EPC 20 includes the MME (Mobility Management Entity)/S-GW (Serving-Gateway) 300, and an OAM 400 (Operation and Maintenance). Further, the EPC 20 corresponds to a core network.

The MME is a network node for performing various mobility controls, for example, for the UE 100 and corresponds to a controller. The S-GW is a network node that performs control to transfer user data and corresponds to a mobile switching center.

The MME performs various types of mobility managements, an authentication process, and the like, on the UE 100. The MME performs the verification (hereinafter, referred to as "CSG verification") to the UE 100 for the access right to the CSG cell/hybrid cell.

A general handover procedure to the CSG cell uses the S1 interface. The MME performs the CSG verification to the UE 100, specifically, confirms whether or not the UE 100 is a member UE of the CSG cell. When it is confirmed that the UE 100 is a member UE of the CSG cell (that is, in the case of succeeding in the CSG verification), a handover of the UE 100 to the CSG cell is possible. On the other hand, when it is not confirmed that the UE 100 is a member UE of the CSG cell (that is, in the case of failing in the CSG verification), a handover of the UE 100 to the CSG cell is refused.

The OAM 400 is a server device managed by an operator and performs maintenance and monitoring of the E-UTRAN 10.

Next, the configurations of the UE 100 and the eNB 200 will be described.

Figure 2:
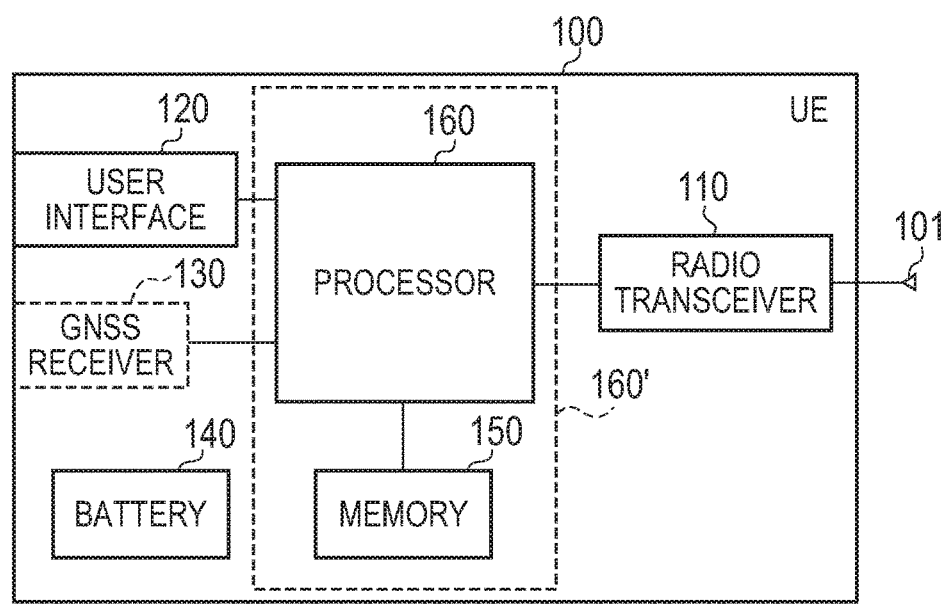
FIG. 2 is a block diagram of a UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. In addition, the memory 150 is integrated with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 stores a power to be supplied to each block of the UE 100.

The memory 150 stores a program to be executed by the processor 160 and information to be used for a process by the processor 160.

The processor 160 includes a baseband processor configured to perform modulation and demodulation, coding and decoding and the like of the baseband signal, and a CPU (Central Processing Unit) configured to perform various processes by executing the program stored in the memory 150. The processor 160 may further include a codec that performs encoding and decoding of sound and video signals. The processor 160 performs various processes and implements various communication protocols which will be described later.

Figure 3:
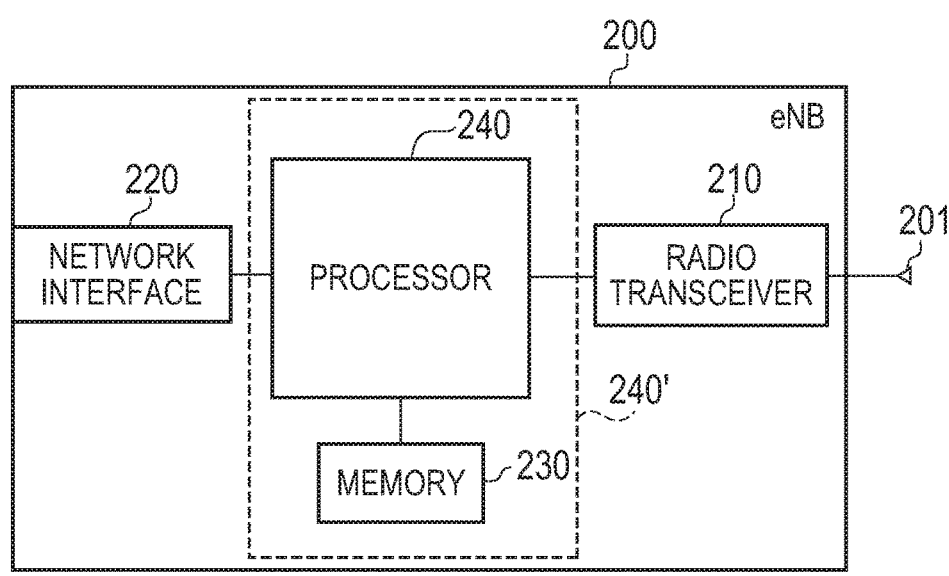
FIG. 3 is a block diagram of an eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute the control unit. In addition, the memory 230 is integrated with the processor 240, and this set (that is, a chipset) may be called a processor 240'.

The antenna 201 and the radio transceiver 210 are used to transmit and receive the radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and the CPU that executes the program stored in the memory 230 to perform various processes. The processor 240 performs various processes and implements various communication protocols which will be described later.

Figure 4:
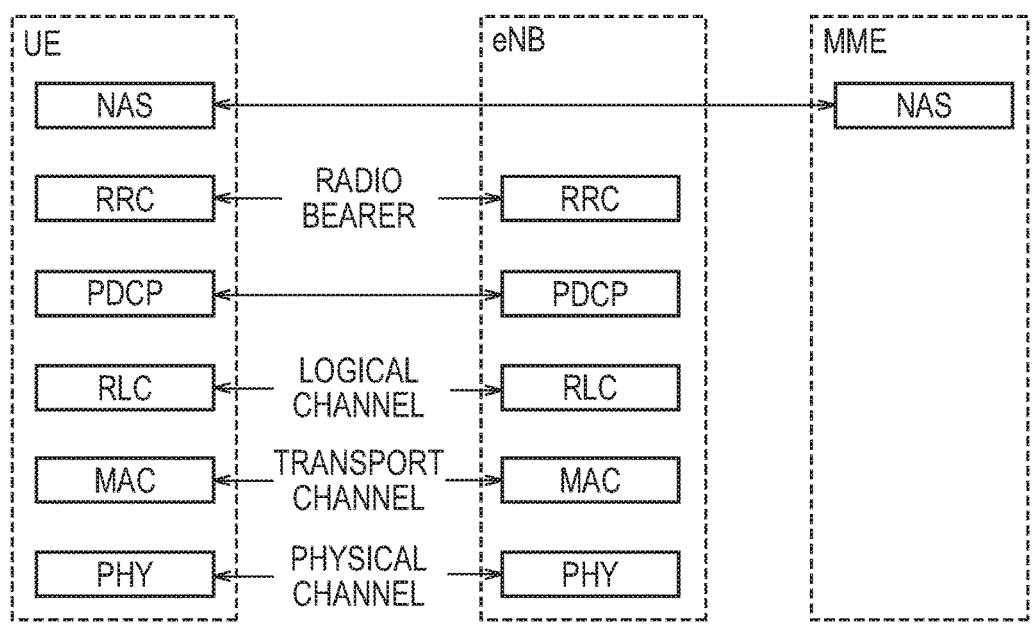
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and extension, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

(Operation Sequence According to Embodiment)

Next, operation sequences 1 to 3 of the mobile communication system according to the embodiment will be described.

(1) Operation Sequence 1

Figure 5:
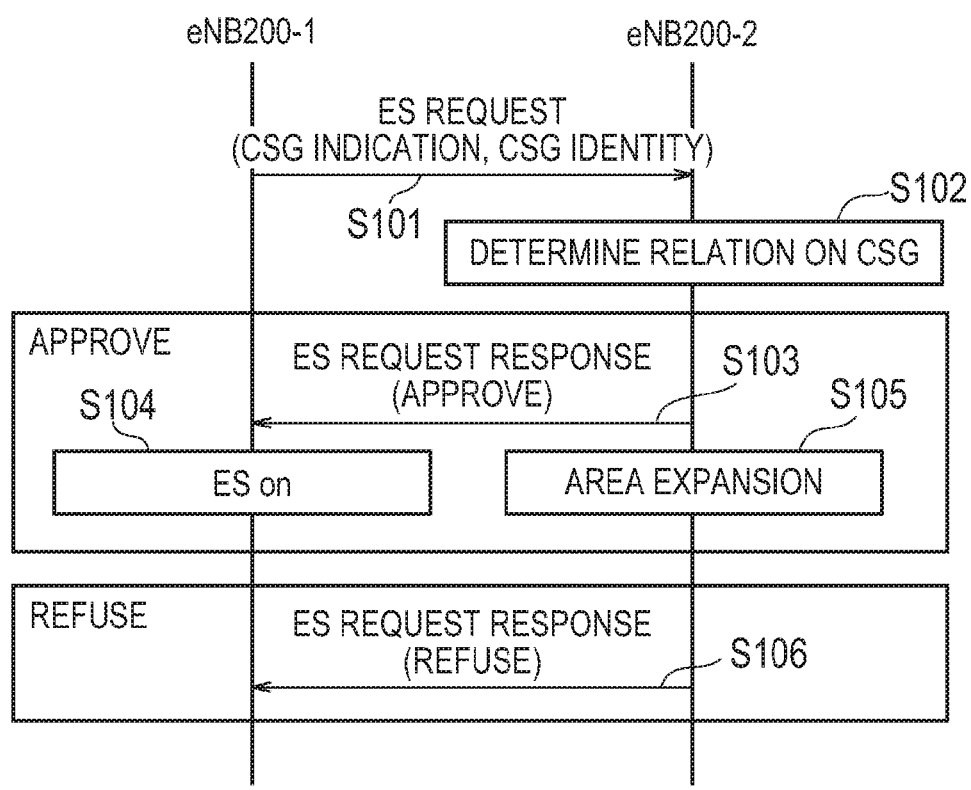
FIG. 5 is a sequence diagram describing an operation sequence 1 of a mobile communication system according to an embodiment.

First, an operation sequence 1 will be described using FIG. 5 to FIG. 9. FIG. 5 is a sequence diagram describing the operation sequence 1 of the mobile communication system according to the embodiment. FIG. 6(A) to FIG. 8(B) are explanatory diagrams describing the operation sequence 1 of the mobile communication system according to the embodiment. FIG. 9 is a flowchart for describing an example of an operation of the eNB 200-2 in the operation sequence 1.

In the embodiment, the mobile communication system has the eNB 200-1 and the eNB 200-2. The eNB 200-1 and the eNB 200-2 are in a respectively neighboring eNB relation (see FIG. 6(A)).

Each of the eNB 200-1 and the eNB 200-2 manages a cell to which an access mode defining an accessible UE 100 is settable. Each of the eNB 200-1 and the eNB 200-2 is capable of setting an access mode such as a "closed mode", a "hybrid mode", and an "open mode" to its own cell.

The cell to which the closed mode is set corresponds to a CSG cell, the cell to which the hybrid mode is set corresponds to a hybrid cell, and the cell to which the open mode is set corresponds to an open cell.

Further, the eNB 200-1 corresponds to an off target base station that intends to turn off its own cell, and the eNB 200-2 corresponds to an extension target base station (which is at least a candidate base station to perform cell extension) to perform cell extension for compensating a cell of the eNB 200-1.

The eNB 200-1 is capable of determining whether to turn off its own cell, in accordance with any one of the following first to third determination methods.

As the first determination method, the eNB 200-1 determines whether or not to turn off its own cell, on the basis of a fluctuation over time in a traffic condition (the number of UEs to be connected, the amount of data to be exchanged, the usage ratio of radio resource, or the like) in the eNB 200-1 and/or the eNB 200-2. For example, in a time zone when the amount of data to be exchanged is decreased, for example, the eNB 200-1 determines to turn off its own cell.

As the second determination method, the eNB 200-1 determines whether or not to turn off its own cell, on the basis of an instruction (energy saving ON/OFF command) from an OAM (Operation and Maintenance).

As the third determination method, the eNB 200-1 determines whether or not to perform energy saving, on the basis of a power supply state of the eNB 200-1 and/or the eNB 200-2. For example, the eNB 200-1 determines to turn off its own cell in a case, for example, a case where a power supply to the eNB 200-1 is cut off (when the eNB 200-1 is driven by a battery), a case where a battery remaining amount of the eNB 200-1 falls below a defined value, or a case where output power of private power generation power (solar, etc.) of the eNB 200-1 falls below a defined value. It is noted that through a notification of the power supply state from the eNB 200-2, the eNB 200-1 is capable of comprehending the power supply state of the eNB 200-2.

Description proceeds with an assumption that the eNB 200-1 determined to turn off its own cell, below.

As shown in FIG. 5, in step S101, the eNB 200-1 transmits, to the eNB 200-2, an ES request to request for performing cell extension. The eNB 200-2 receives the ES request.

The ES request includes: a CSG ID (CSG Identity: CSG identifier) that is an identifier of a cell which treats differently a UE 100 depending on the presence of an access right; and a CSG indication indicating whether an access mode of a cell is set to the closed mode or set to the hybrid mode.

When the CSG indication is "true", it is indicated that the cell is set to the closed mode. When the CSG indication is "false", it is indicated that the cell is set to the hybrid mode or to the open mode.

When knowing that a cell to which the closed mode is settable (or to which the closed mode is set) is managed by the eNB 200-2, the eNB 200-1 may transmit, to the eNB 200-2, an ES request including a CSG ID and a CSG indication, or may temporarily transmit, to the eNB 200-2 that is a neighboring eNB that manages a neighboring cell, an ES request including a CSG ID and a CSG indication, to the eNB 200-2.

In step S102, the eNB 200-2 determines, on the basis of the received ES request, a relation on a CSG between the cell of the eNB 200-1 which sent the ES request (hereinafter, referred to as "cell 1") and its own cell (hereinafter, referred to as "cell 2"). That is, the eNB 200-2 determines whether or not a UE 100-1 connected to the cell 1 is connectable to the cell 2. The eNB 200-2 decides, on the basis of a determination result, whether or not to approve the ES request (that is, to extend its own cell).

An example of the determination will be specifically described, below.

Figure 6A:
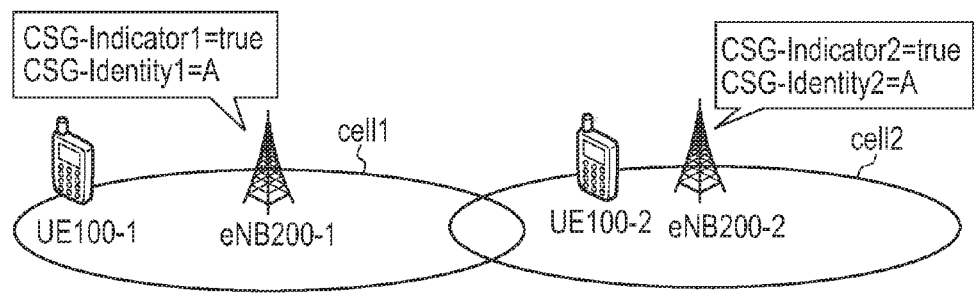
FIGS. 6(A) to (C) are explanatory diagrams describing the operation sequence 1 of the mobile communication system according to the embodiment.

(a) When the Access Mode of the Cell 2 is Set to Closed (a-1) When the CSG ID of the Cell 1 and the CSG ID of the Cell 2 are the Same As shown in FIG. 6(A), a CSG indication 1 of the cell 1 is true, and a CSG ID 1 of the cell 1 is A. A CSG indication 2 of the cell 2 is true, and a CSG ID 2 of the cell 2 is A.

Figure 6B:
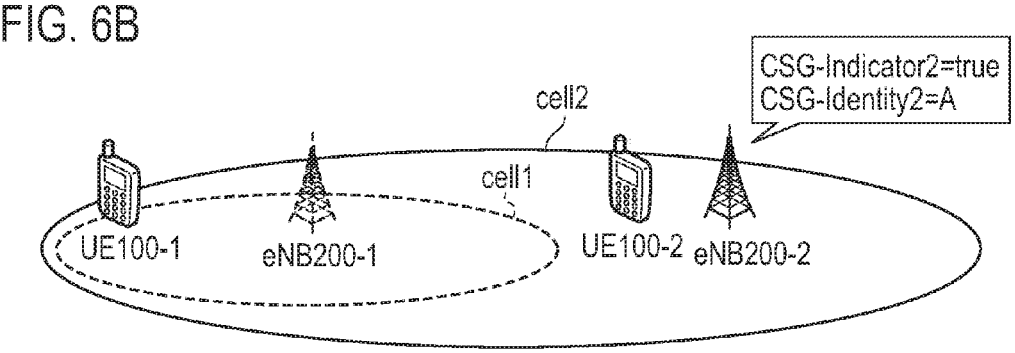

In this case, the cell 1 and the cell 2 have the same CSG ID, and thus, as shown in FIG. 6(B), when performing cell extension, the eNB 200-2 determines that the UE 100-1 connected to the cell 1 is possible to connect to the cell 2.

Figure 6C:
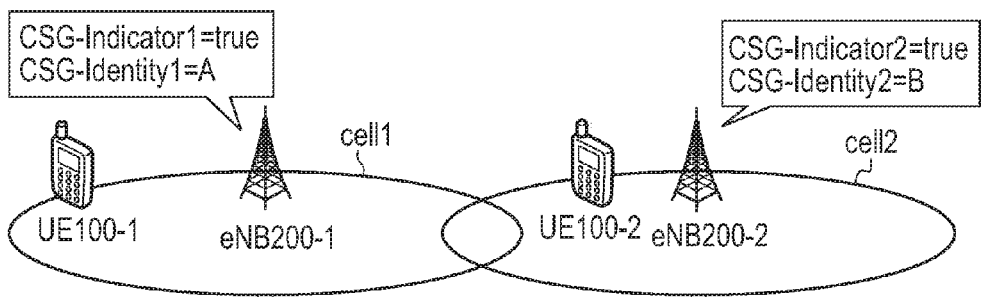

(a-2) When the CSG ID of the Cell 1 and the CSG ID of the Cell 2 are Different As shown in FIG. 6(C), the CSG indication 1 of the cell 1 is true, and a CSG ID 1 of the cell 1 is A. The CSG indication 2 of the cell 2 is true, and the CSG ID 2 of the cell 2 is B.

In this case, the CSG ID is different between the cell 1 and the cell 2, and thus, when performing cell extension, the eNB 200-2 determines that the UE 100-1 connected to the cell 1 is not possible to connect to the cell 2.

(b) When the Access Mode of the Cell 2 is Set to the Open Mode

Figure 7A:
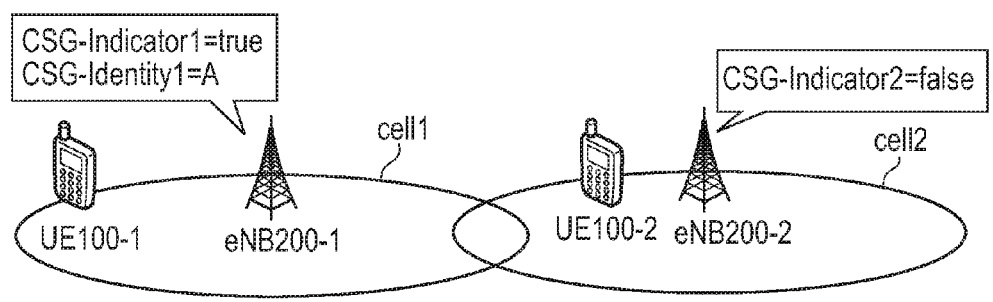
FIGS. 7(A) and 7(B) are explanatory diagrams describing the operation sequence 1 of the mobile communication system according to the embodiment.

As shown in FIG. 7(A), the CSG indication 1 of the cell 1 is true, and the CSG ID 1 of the cell 1 is A. The CSG indication 2 of the cell 2 is false, and the CSG ID 2 of the cell 2 is none.

Figure 7B:
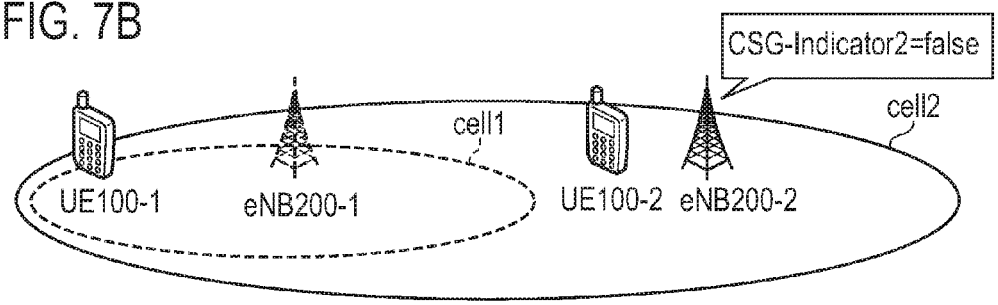

In this case, the own cell of the eNB 200-2 is set to the open mode, and thus, as shown in FIG. 7(B), when performing cell extension, the eNB 200-2 determines that the UE 100-1 connected to the cell 1 is possible to connect to the cell 2.

(c) When the Access Mode of the Cell 2 is Set to the Hybrid Mode

Figure 8A:
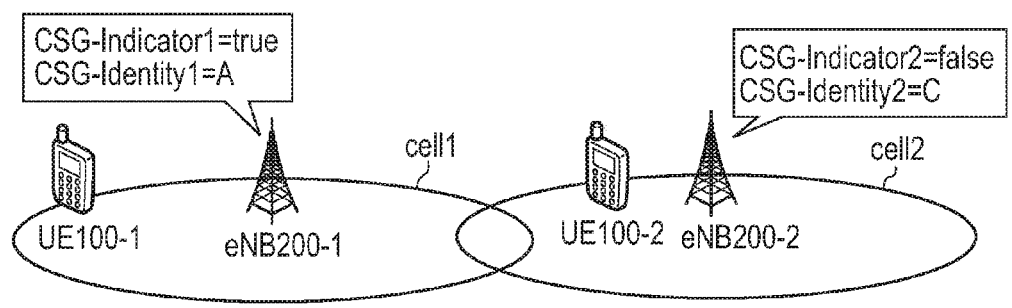
FIGS. 8(A) and 8(B) are explanatory diagrams describing the operation sequence 1 of the mobile communication system according to the embodiment.
Figure 9:
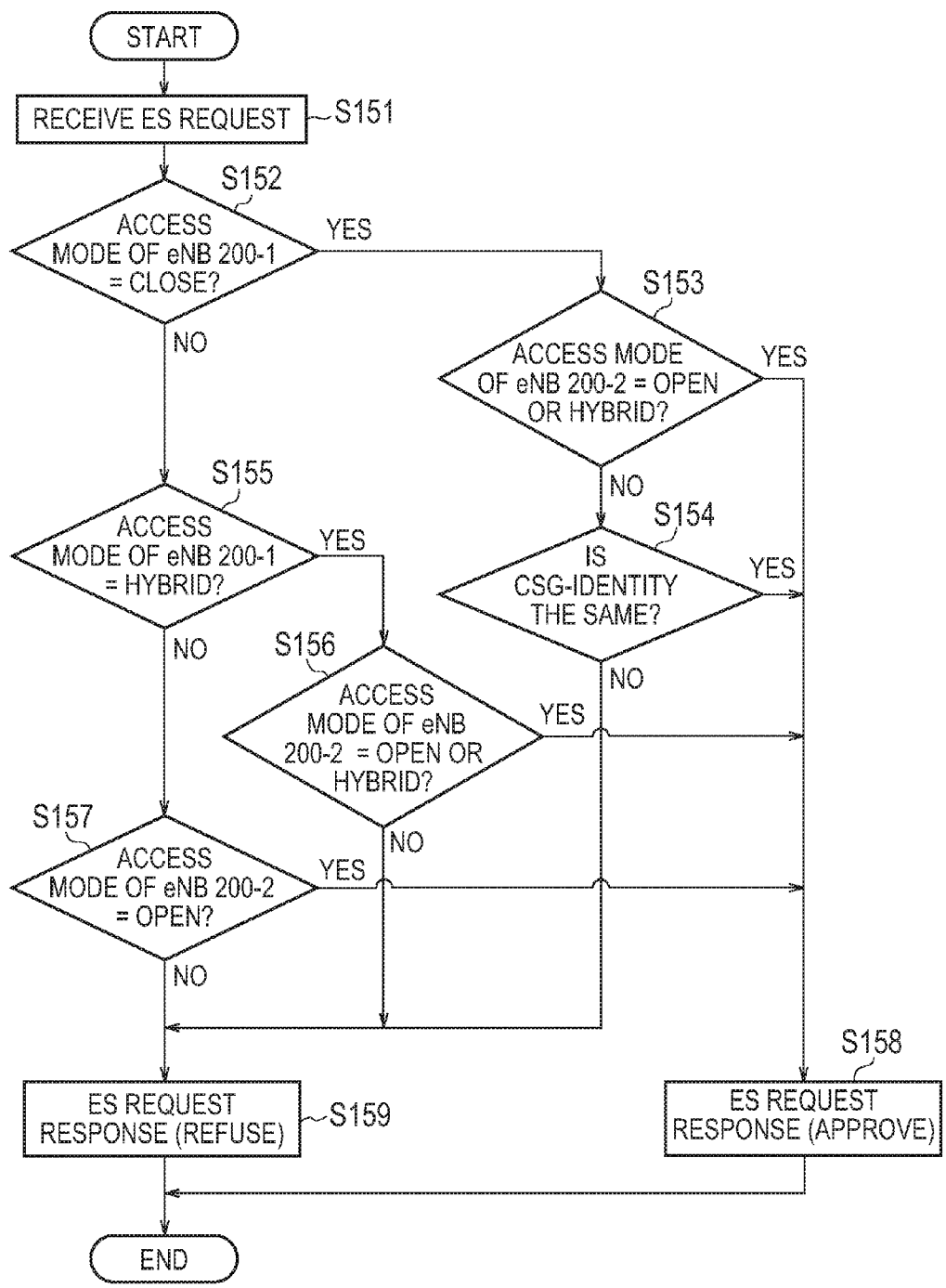
FIG. 9 is a flowchart for describing an example of an operation of an eNB 200-2 in the operation sequence 1.

As shown in FIG. 8(A), the CSG indication 1 of the cell 1 is true, and the CSG ID 1 of the cell 1 is A. The CSG indication 2 of the cell 2 is false, and the CSG ID 2 of the cell 2 is C.

Figure 8B:
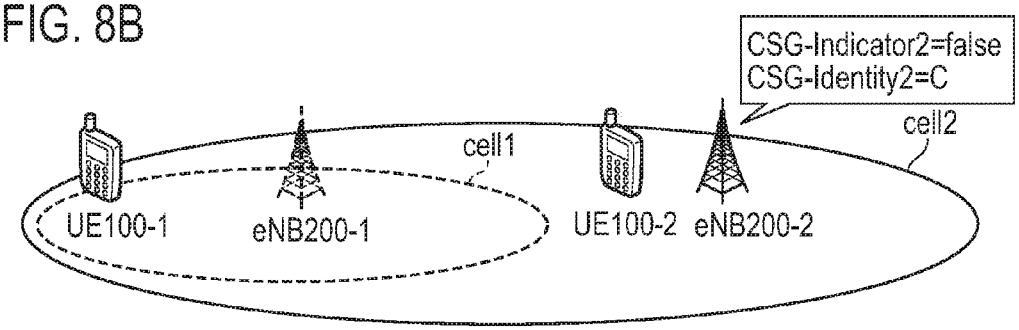

In this case, the own cell of the eNB 200-2 is set to the hybrid mode, and thus, as shown in FIG. 8(B), when performing cell extension, the eNB 200-2 determines that the UE 100-1 connected to the cell 1 is possible to connect to the cell 2.

Next, an example of the operation of the eNB 200-2 in step S102 will be described.

In step S151, the eNB 200-2 receives the ES request from the eNB 200-1.

In step S152, the eNB 200-2 determines whether or not the access mode of the eNB 200-1 (that is, the cell 1) is the closed mode. When "YES" (when the access mode of the eNB 200-1 is the closed mode), the eNB 200-2 executes a process of step S153, and when "NO", executes a process of step S155.

In step S153, the eNB 200-2 determines whether or not the access mode of the eNB 200-2 (that is, the cell 2) is the open mode or the hybrid mode. When "YES" (when the access mode of the eNB 200-2 is the open mode or the hybrid mode), the eNB 200-2 executes a process of step S158, and when "NO", executes a process of step S154.

In step S154, the eNB 200-2 determines whether or not the CSG ID of the eNB 200-1 (that is, the cell 1) and the CSG ID of the eNB 200-2 (that is, the cell 2) are the same. When "YES" (when the CSG ID of the eNB 200-1 and the CSG ID of the eNB 200-2 are the same), an eNB 200-2 executes a process of step S158, and when "NO", executes a process of step S159.

In step S155, the eNB 200-2 determines whether or not the access mode of the eNB 200-1 (that is, the cell 1) is the hybrid mode. When "YES" (when the access mode of the eNB 200-1 is the hybrid mode), the eNB 200-2 executes a process of step S156, and when "NO", executes a process of step S157.

In step S156, the eNB 200-2 determines whether or not the access mode of the eNB 200-2 (that is, the cell 2) is the open mode or the hybrid mode. When "YES" (when the access mode of the eNB 200-2 is the open mode or the hybrid mode), the eNB 200-2 executes the process of step S158, and when "NO", executes a process of step S159.

It is noted that when determining "No" in step S156, the eNB 200-2 may execute the process of step S154.

In step S157, the eNB 200-2 determines whether or not the access mode of the eNB 200-1 (that is, the cell 1) is the open mode. When "YES" (when the access mode of the eNB 200-1 is the open mode), the eNB 200-2 executes the process of step S158, and when "NO", executes the process of step S159.

In step S158, the eNB 200-2 determines that the UE 100-1 connected to the cell 1 is connectable to the cell 2, and on the basis of this determination result, decides to respond with an indication of approving the ES request.

On the other hand, in step S159, the eNB 200-2 determines that the UE 100-1 connected to the cell 1 is not connectable to the cell 2, and on the basis of this determination result, decides to respond with an indication of refusing the ES request.

Now, description returns to FIG. 5. The eNB 200-2 responds to the ES request, on the basis of the determination result of step S102. It is noted that the eNB 200-2 may finally determine whether or not to approve the ES request in consideration of other factors as well as the determination result of step S102.

When deciding to respond with an indication of approving the ES request, the eNB 200-2 executes a process of step S103, and when deciding to respond with an indicating of refusing the ES request, executes a process of step S106.

In step S103, the eNB 200-2 transmits the response with an indication of approving the ES request, to the eNB 200-1. The eNB 200-1 receives the response with an indication of approving the ES request.

In step S104, the eNB 200-1 decides whether or not to turn off the cell 1 on the basis of the response from the eNB 200-2. The eNB 200-1 decides to turn off the cell 1 because the response from the eNB 200-2 is a response with an indication of approving the ES request. The eNB 200-1 sets the energy saving mode to ON, and turns off the cell 1.

In step S105, the eNB 200-2 extends the cell 2 to compensate the coverage of the cell 1.

It is noted that the process of step S104 and the process of step S105 may be performed at the simultaneous timing, and one process may be performed before the other process.

On the other hand, in step S106, the eNB 200-2 transmits the response with an indication of refusing the ES request, to the eNB 200-1. The eNB 200-1 receives the response with an indication of refusing the ES request.

The eNB 200-1 decides whether or not to turn off the cell 1 on the basis of the response from the eNB 200-2. The eNB 200-1 decides to not turn off the cell 1 because the response from the eNB 200-2 is a response with an indication of refusing the ES request. When deciding not to turn off the cell 1, the eNB 200-1 transmits the ES request to another eNB 200, on the basis of the neighboring cell list. When receiving, from the other eNB 200 that receives the ES request from the eNB 200-1, the response with an indication of approving the ES request, the eNB 200-1 turns off the cell 1. The other eNB 200 extends the cell to compensate the coverage of the cell 1.

(2) Operation Sequence 2

Next, an operation sequence 2 will be described using FIG. 10 to FIG. 15. It is noted that description proceeds with a focus on a portion different from the above-described operation sequence 1, and a similar portion will not be described, where necessary.

Figure 10:
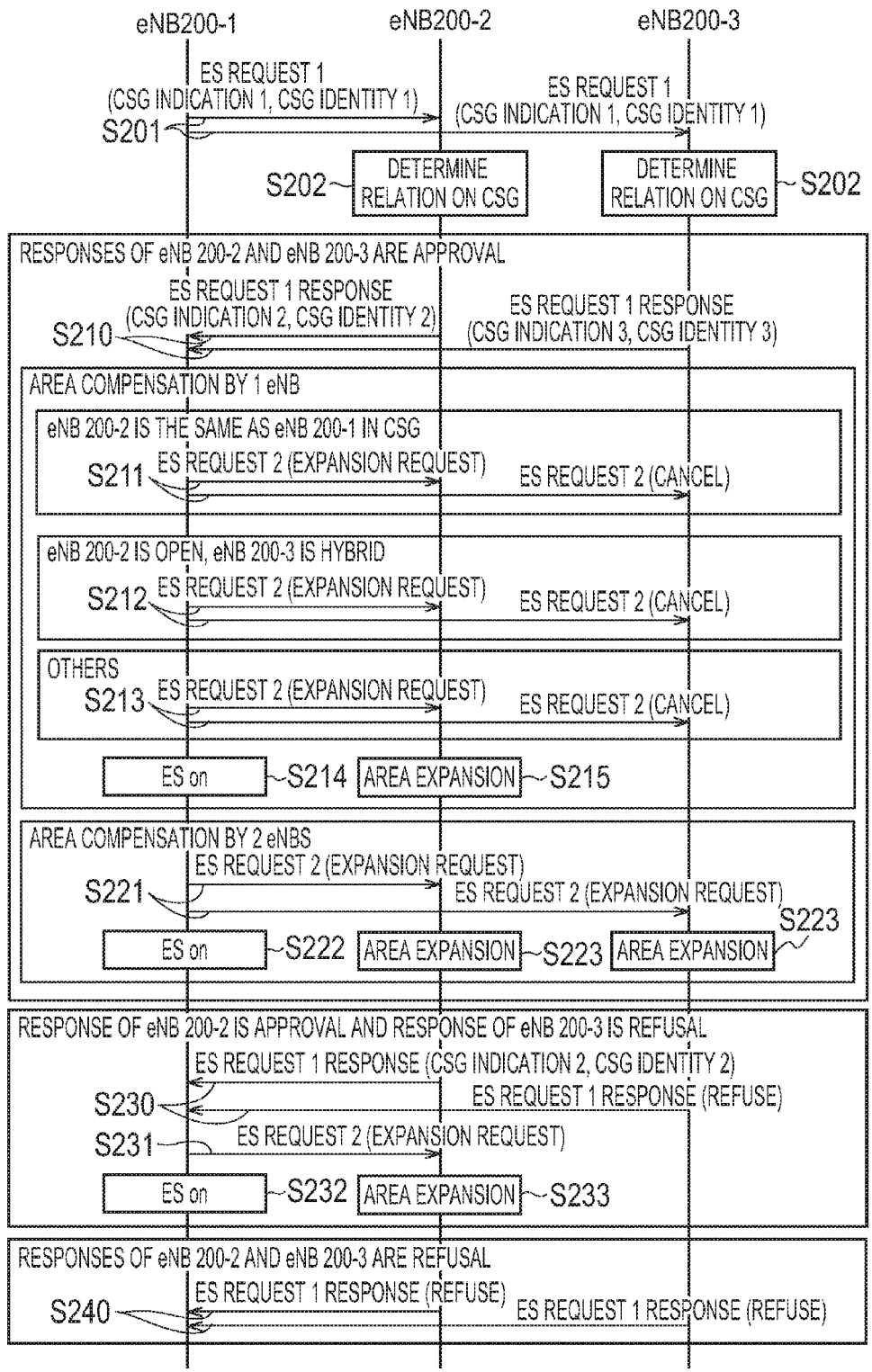
FIG. 10 is a sequence diagram describing an operation sequence 2 of the mobile communication system according to the embodiment.

FIG. 10 is a sequence diagram describing the operation sequence 2 of the mobile communication system according to the embodiment. FIG. 11(A) to FIG. 14(C) are explanatory diagrams describing the operation sequence 2 of the mobile communication system according to the embodiment. FIG. 15 is a flowchart for describing an example of an operation of the eNB 200-1 in the operation sequence 2.

In the above-described operation sequence 1, the eNB 200-1 transmits the ES request to one eNB 200, and decides, on the basis of the response to one ES request, whether or not to turn off the cell 1. On the other hand, in the operation sequence 2, the eNB 200-1 transmits ES requests to a plurality of eNBs 200, and decides, on the basis of the response to the plurality of ES requests, whether or not to turn off the cell 1.

As shown in FIG. 10, in step S201, the eNB 200-1 transmits an ES request 1 to each of the eNB 200-2 and the eNB 200-3 that are neighboring eNBs. Each of the eNB 200-2 and the eNB 200-3 receives the ES request 1. The ES request 1 corresponds to the ES request of step S101.

In step S202, similarly to step S102, the eNB 200-2 determines, on the basis of the received ES request, a relation on a CSG between the cell of the eNB 200-1 which sent the ES request (hereinafter, referred to as "cell 1") and its own cell (hereinafter, referred to as "cell 2"). Likewise, the eNB 200-3 determines a relation on a CSG between the cell 1 and its cell (hereinafter, referred to as "cell 3").

When each of the eNB 200-2 and the eNB 200-3 approves the ES request, a process of step S210 is executed. When the eNB 200-2 approves the ES request and the eNB 200-3 refuses the ES request, a process of step S230 is executed. When each of the eNB 200-2 and the eNB 200-3 refuses the ES request, a process of step S240 is executed.

In step S210, each of the eNB 200-2 and the eNB 200-3 transmits a response with an indication of approving the ES request (ES request response), to the eNB 200-1. The ES request response from the eNB 200-2 includes the CSG ID 2 of the cell 2 and the CSG indication 2 of the cell 2, and the ES request response from the eNB 200-3 includes a CSG ID 3 of the cell 3 and a CSG indication 3 of the cell 3.

The eNB 200-1 decides whether or not to turn off the cell 1 on the basis of the received ES request response. Further, when receiving a response with an indication of approving the ES request, from a plurality of eNBs 200, the eNB 200-1 decides an eNB 200 (extension target eNB) caused to perform cell extension from among the plurality of eNBs 200.

An example of the decision will be specifically described, below.

Figure 11A:
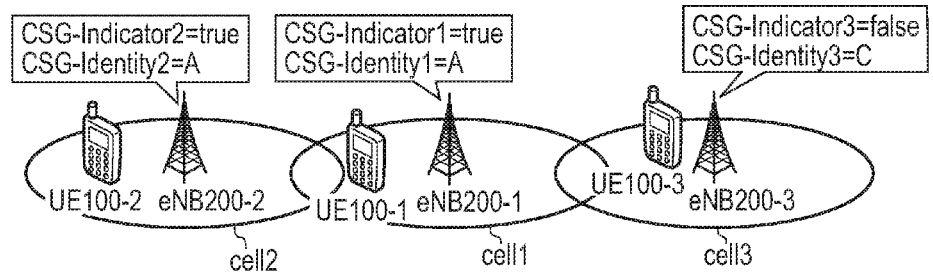
FIGS. 11(A) and 11(B) are explanatory diagrams describing the operation sequence 2 of the mobile communication system according to the embodiment.

(a) When the CSG ID of the Cell 1 and the CSG ID of the Cell 2 are the Same and the CSG ID of the Cell 1 and the CSG ID of the Cell 3 are Different As shown in FIG. 11(A), the CSG indication 1 of the cell 1 is true, and the CSG ID 1 of the cell 1 is A. The CSG indication 2 of the cell 2 is true, and the CSG ID 2 of the cell 2 is A. The CSG indication 3 of the cell 3 is false, and CSG ID 3 of the cell 3 is C.

Figure 11B:
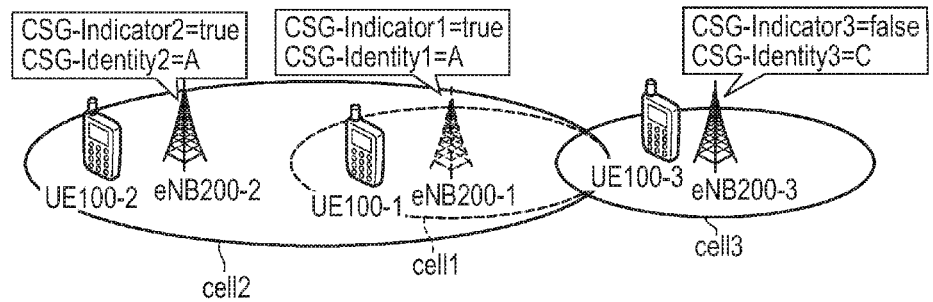

In this case, the cell 1 and the cell 2 have the same CSG ID, and thus, as shown in FIG. 11(B), the eNB 200-1 decides the eNB 200-2 as the extension target eNB.

Figure 12A:
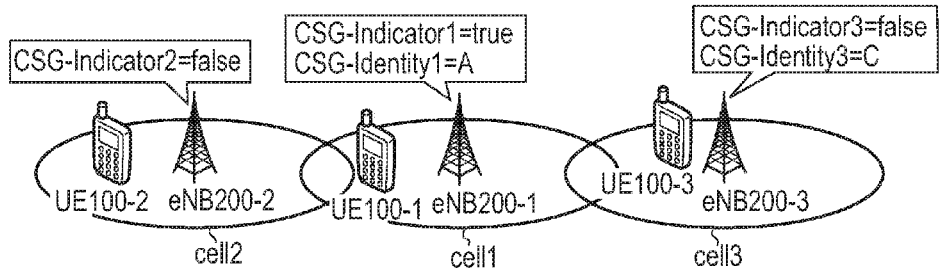
FIGS. 12(A) and 12(B) are explanatory diagrams describing the operation sequence 2 of the mobile communication system according to the embodiment.

(b) When the Access Mode of the Cell 2 is Set to the Open Mode, and the Access Mode of the Cell 3 is not Set to the Open Mode As shown in FIG. 12(A), the CSG indication 1 of the cell 1 is true, and the CSG ID 1 of the cell 1 is A. The CSG indication 2 of the cell 2 is false, and the CSG ID 2 of the cell 2 is none. The CSG indication 3 of the cell 3 is false, and the CSG ID 3 of the cell 3 is C.

Figure 12B:
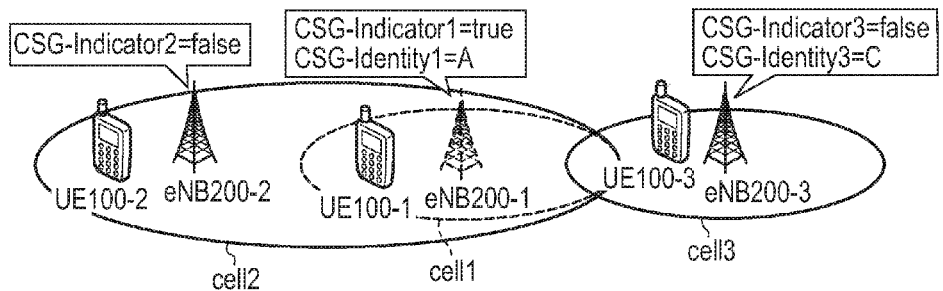

In this case, the access mode of the cell 2 is set to the open mode, and thus, as shown in FIG. 12(B), the eNB 200-1 decides the eNB 200-2 as the extension target eNB.

Figure 13A:
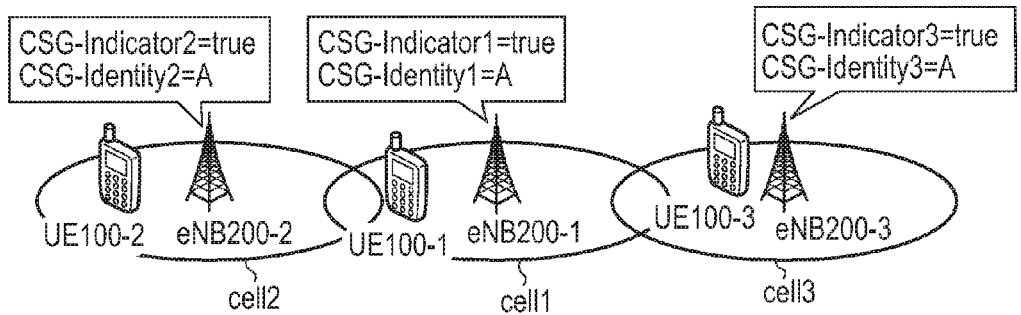
FIGS. 13(A) to 13(C) are explanatory diagrams describing the operation sequence 2 of the mobile communication system according to the embodiment.

(c) When the CSG ID of Each of the Cell 1, the Cell 2, and the Cell 3 is the Same As shown in FIG. 13(A), the CSG indication 1 of the cell 1 is true, and the CSG ID 1 of the cell 1 is A. The CSG indication 2 of the cell 2 is true, and the CSG ID 2 of the cell 2 is A. The CSG indication 3 of the cell 3 is true, and the CSG ID 3 of the cell 3 is A.

Figure 13B:
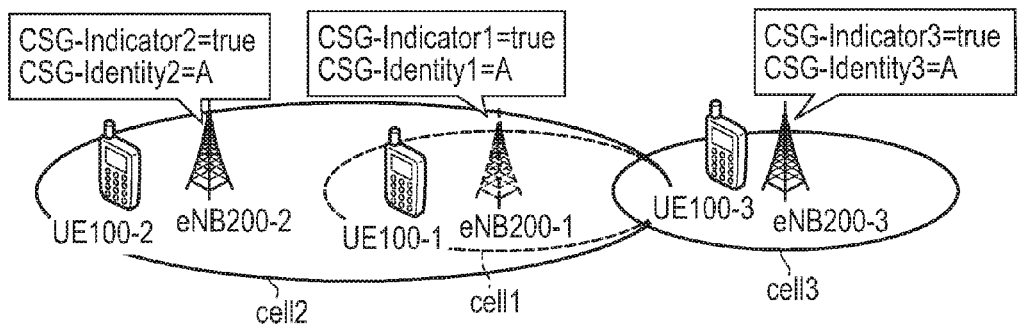
Figure 13C:
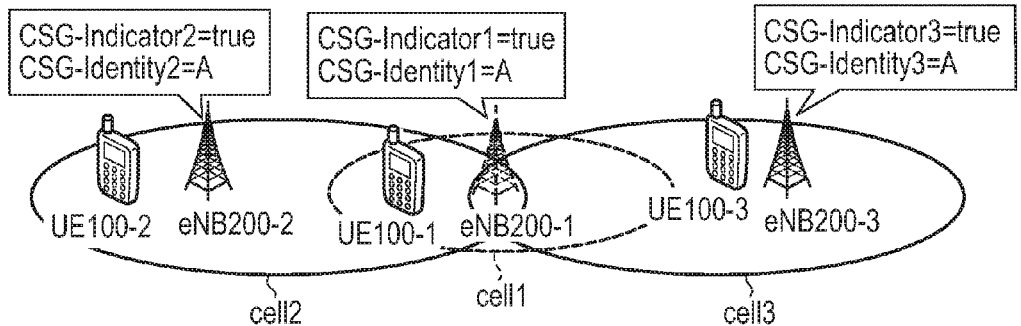

In this case, the CSG ID of each of the cell 1, the cell 2, and the cell 3 is the same, and thus, as shown in FIG. 13(B), the eNB 200-1 decides the eNB 200-2 which is one of the eNB 200-2 and the eNB 200-3, as the extension target eNB. Alternatively, as shown in FIG. 13(C), the eNB 200-1 decides the eNB 200-2 and the eNB 200-3 as the extension target eNB.

Figure 14A:
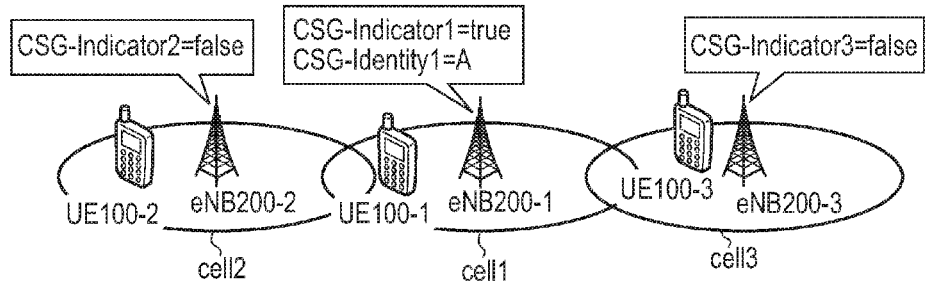
FIGS. 14(A) to 14(C) are explanatory diagrams describing the operation sequence 2 of the mobile communication system according to the embodiment.
Figure 15:
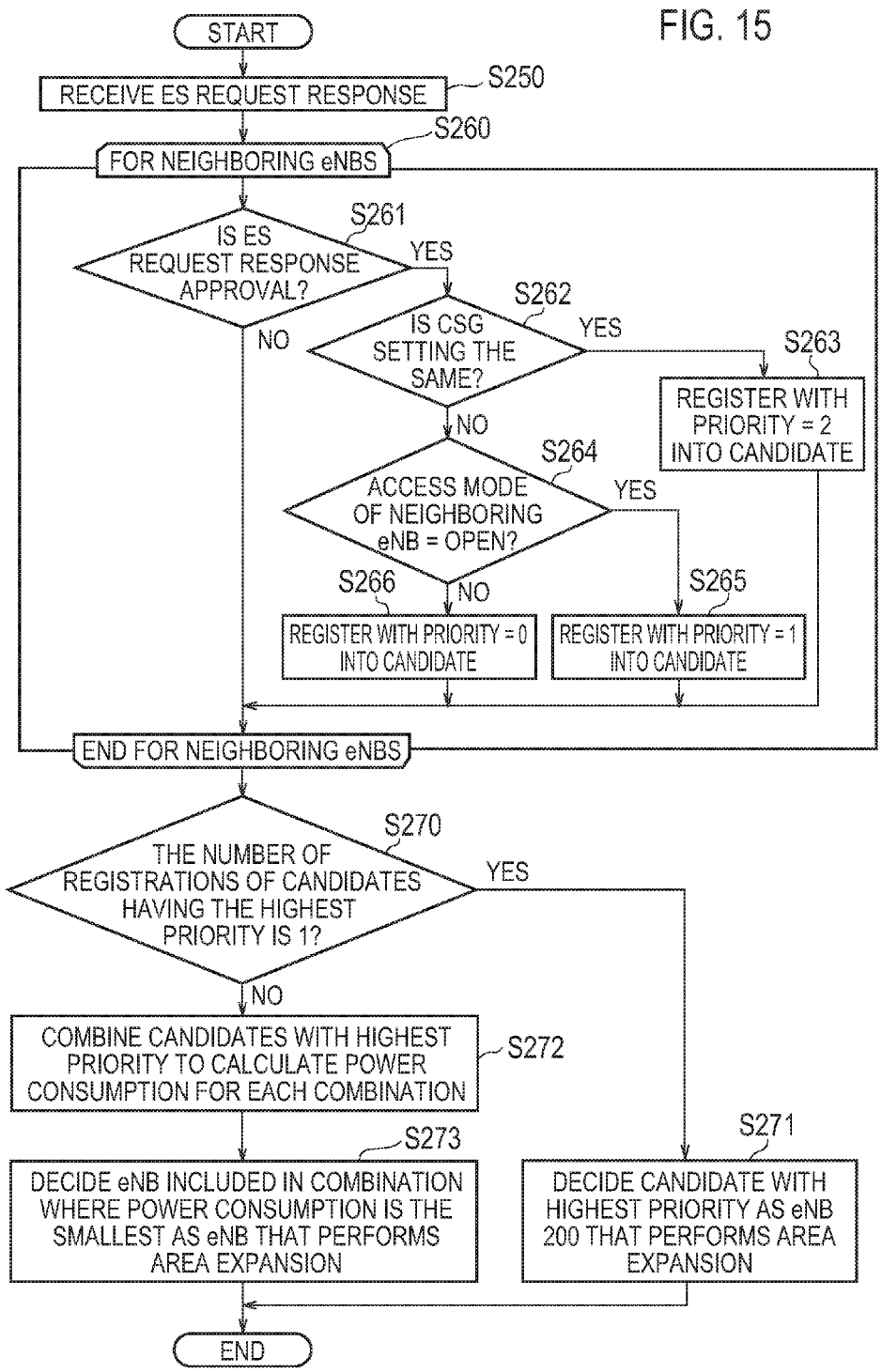
FIG. 15 is a flowchart for describing an example of an operation of an eNB 200-1 in the operation sequence 2.

(d) When the Access Mode of Each of the Cell 2 and the Cell 3 is Set to the Open Mode As shown in FIG. 14(A), the CSG indication 1 of the cell 1 is true, and the CSG ID 1 of the cell 1 is A. The CSG indication 2 of the cell 2 is false, and the CSG ID 2 of the cell 2 is none. The CSG indication 3 of the cell 3 is false, and the CSG ID 3 of the cell 3 is none.

Figure 14B:
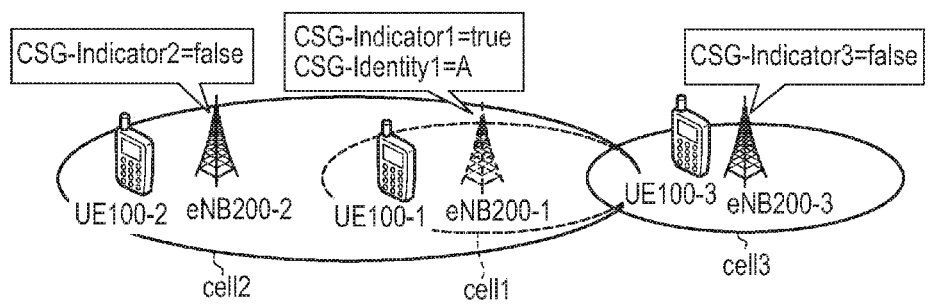
Figure 14C:
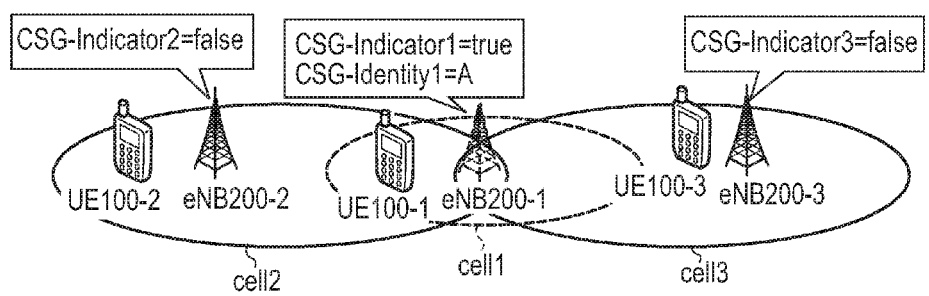

In this case, the access mode of each of the cell 2 and the cell 3 is set to the open mode, and thus, as shown in FIG. 14(B), the eNB 200-1 decides the eNB 200-2 which is one of the eNB 200-2 and the eNB 200-3, as the extension target eNB. Alternatively, as shown in FIG. 14(C), the eNB 200-1 decides the eNB 200-2 and the eNB 200-3 as the extension target eNB.

Next, in step S210, an example of an operation of the eNB 200-1 that receives the response to the ES request, from a plurality of eNBs 200 will be described.

In step S250, the eNB 200-1 receives the response to the ES request, from the plurality of eNBs 200 (neighboring eNBs).

In step S260, the eNB 200-1 selects one eNB 200 from among the plurality of eNBs 200 to which the eNB 200-1 transmits the ES request, and performs the following process. The eNB 200-1 repeats the following process until all the plurality of eNBs 200 are selected.

In step S261, the eNB 200-1 determines whether or not the ES request response from the selected eNB 200 is a response with an indication of approving the ES request. When "YES" (when the ES request response from the selected eNB 200 is a response with an indication of approving the ES request response), the eNB 200-1 executes a process of step S262, and when "NO", ends a process on the selected eNB 200.

In step S262, the eNB 200-1 determines whether or not the CSG ID of the cell 1 and the CSG ID of the cell of the selected eNB 200 are the same. When "YES" (when the CSG ID of the cell 1 and the CSG ID of the cell of the selected eNB 200 are the same), the eNB 200-1 executes a process of step S263, and when "NO", executes a process of step S264.

In step S263, eNB 200-1 sets a priority of the selected eNB 200 to "2", and registers the selected eNB 200 as a candidate extension target eNB. Then, the process on the selected eNB 200 is ended.

In step S264, the eNB 200-1 determines whether or not the access mode (of the cell) of the selected eNB 200 is the open mode. When "YES" (when the access mode of the selected eNB 200 is the open mode), the eNB 200-1 executes a process of step S265, and when "NO", executes a process of step S266.

In step S265, eNB 200-1 sets the priority of the selected eNB 200 to "1", and registers the selected eNB 200 as a candidate extension target eNB. Then, the process on the selected eNB 200 is ended.

In step S266, eNB 200-1 sets the priority of the selected eNB 200 to "0", and registers the selected eNB 200 as a candidate extension target eNB. Then, the process on the selected eNB 200 is ended.

It is noted that in the embodiment, a larger value of the priority represents that the eNB is more preferentially treated. Therefore, the priority "2" has the highest priority.

In step S270, the eNB 200-1 determines whether or not the priority of the candidate extension target eNB having the highest priority is "1". When "YES" (when the priority of the candidate extension target eNB having the highest priority is "1"), the eNB 200-1 executes a process of step S271, and when "NO", executes a process of step S272.

In step S271, the eNB 200-1 decides the candidate extension target eNB having the highest priority as the extension target eNB (the eNB 200 that performs area expansion (cell extension)).

In step S272, when there are a plurality of candidate extension target eNBs having the highest priority, the eNB 200-1 combines each of a plurality of candidate extension target eNBs having the highest priority, in order to decide the candidate extension target eNB having a combination where a power consumption based on the cell extension is the smallest, and then calculates (an estimated value of) the power consumption based on the cell extension for each combination.

For example, the eNB 200-1 acquires fixed transmission power information for transmitting a broadcast message not related to UEs to be connected, from each of the plurality of candidate extension target eNBs having the highest priority (or from an upper network device). The eNB 200-1 calculates, on the basis of the transmission power information, the power consumption based on the cell extension for each combination. The eNB 200-1 may calculate the power consumption based on the cell extension for each combination, in consideration of a locational relation of the candidate extension target eNB having the highest priority in addition to the transmission power information.

The eNB 200-1 may request information (maximum transmission power of the eNB 200, for example) necessary to calculate the power consumption, to the candidate extension target eNB having the highest priority, and may inquire the upper network device. Further, the necessary information may be previously included in the ES request response.

In step S273, the eNB 200-1 decides each of the candidate extension target eNB included in the combination where the power consumption based on the cell extension is the smallest as the extension target eNB.

It is noted that when there is one candidate extension target eNB having the highest priority, the eNB 200-1 decides the candidate extension target eNB as the extension target eNB.

Now, description returns to FIG. 10. The eNB 200-1 transmits an ES request 2 on the basis of the above-described decision. The ES request 2 is information for notifying the eNB 200 that transmits, in response to the ES request 1, the response with an indication of approving the ES request, of whether or not the eNB 200 is caused to perform the cell extension. Therefore, the eNB 200-1 transmits, to the eNB 200 that is caused to perform the cell extension, the ES request 2 including information with an indication of causing the cell extension (Expansion request) to be performed, and transmits, to the eNB 200 not performing the cell extension, information with an indication of not performing the cell extension (cancel).

When one eNB 200 is caused to perform the cell extension (that is, area compensation is performed by one eNB 200), any process of steps S211 to S213 is executed, and when two or more eNBs 200 (two eNBs 200 in the embodiment) are caused to perform the cell extension, the eNB 200-1 executes a process of step S221.

In step S211, when determining that the CSG ID of the cell 1 and the CSG ID of the cell 2 are equal and the CSG ID of the cell 1 and the CSG ID of the cell 3 are different, the eNB 200-1 transmits, to the eNB 200-2, the ES request 2 including information indicating the "Expansion request" and transmits, to the eNB 200-3, the ES request 2 including information indicating the "cancel".

In step S212, when the access mode of the cell 2 is set to the open mode and the access mode of the cell 3 is set to the hybrid mode, the eNB 200-1 transmits, to the eNB 200-2, the ES request 2 including the information indicating the "Expansion request" and transmits, to the eNB 200-3, the ES request 2 including the information indicating the "cancel".

In step S213, when deciding on the basis of another condition that the eNB 200-2 is caused to perform the cell extension and the eNB 200-3 is not caused to perform the cell extension, the eNB 200-1 transmits, to the eNB 200-2, the ES request 2 including the information indicating the "Expansion request" and transmits, to the eNB 200-3, the ES request 2 including the information indicating the "cancel".

Steps S214 and S215 correspond to steps S104 and S105 in the operation pattern 1.

In step S221, the eNB 200-1 transmits the ES request 2 including the information indicating the "Expansion request", to each of the eNB 200-2 and the eNB 200-3.

It is noted that the ES request 2 may include information indicating a cell expansion range (information for specifying transmission power, for example).

Steps S222 and S223 correspond to steps S104 and S105 in the operation pattern 1.

Next, in step S230, the eNB 200-2 transmits the response with an indication of approving the ES request, to the eNB 200-1. The eNB 200-3 transmits the response with an indication of refusing the ES request, to the eNB 200-1.

The eNB 200-1 decides whether or not to turn off the cell 1 on the basis of the received ES request response. Specifically, the eNB 200-1 receives the response with an indication of approving the ES request from the eNB 200-2, and then decides to turn off the cell 1.

The eNB 200-1 transmits, to the eNB 200-2, the ES request 2 including the information indicating the "Expansion request". It is noted that the eNB 200-1 does not respond to an ES request 1 response, to the eNB 200-3.

Steps S232 and S233 correspond to steps S104 and S105 in the operation pattern 1.

Next, in step S240, each of the eNB 200-2 and the eNB 200-3 transmits the response with an indication of refusing the ES request, to the eNB 200-1. The eNB 200-1 decides, on the basis of the received ES request response, to not turn off the cell 1, and ends the process according to the embodiment.

(3) Operation Sequence 3

Next, an operation sequence 3 will be described using FIG. 16 to FIG. 18(B). It is noted that description proceeds with a focus on a portion different from the above-described operation sequences 1 and 2, and a similar portion will not be described, where necessary.

Figure 16:
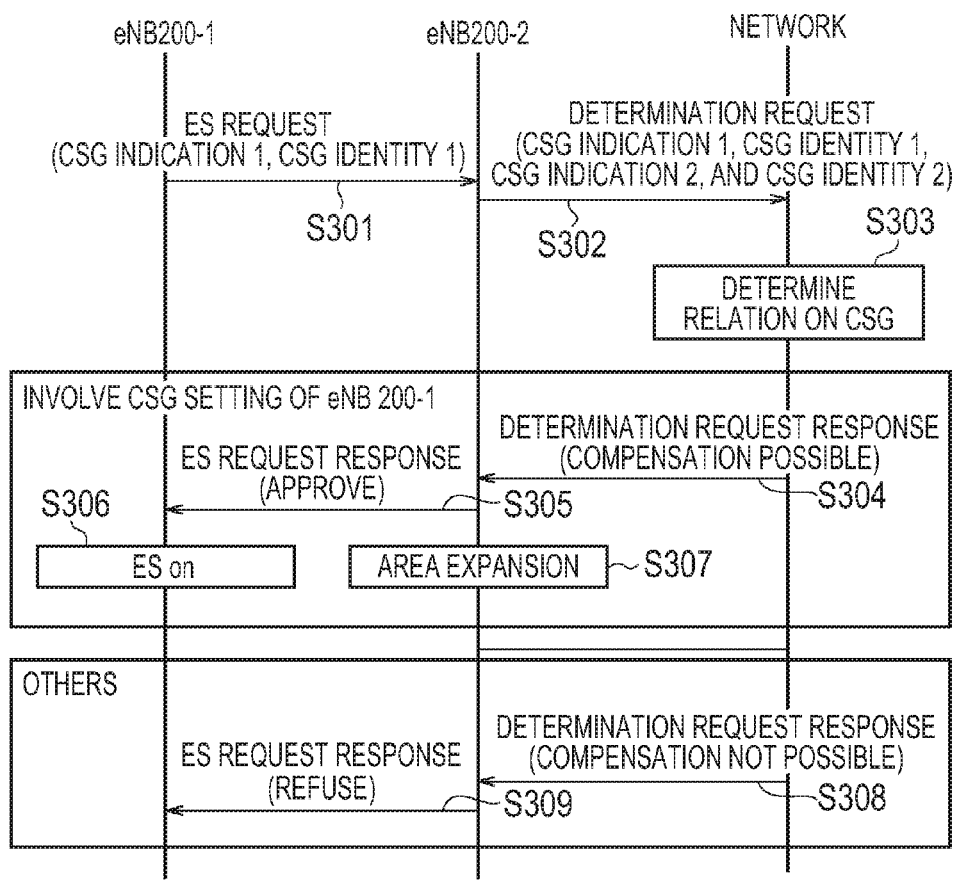
FIG. 16 is a sequence diagram describing an operation sequence 3 of the mobile communication system according to the embodiment.
Figure 17A:
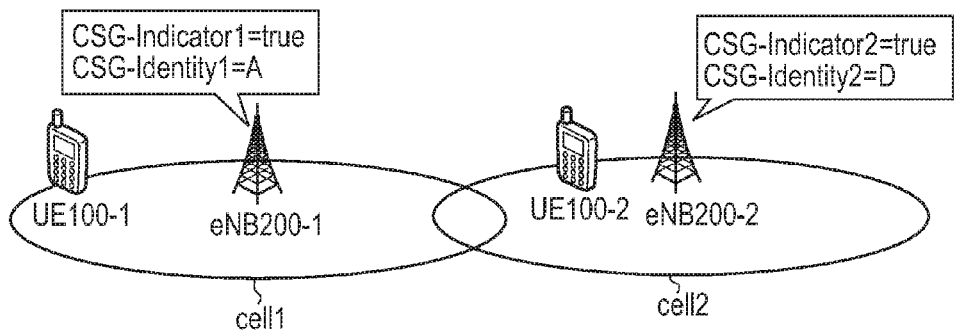
FIGS. 17(A) and 17(B) are explanatory diagrams describing the operation sequence 3 of the mobile communication system according to the embodiment.

FIG. 16 is a sequence diagram describing the operation sequence 3 of the mobile communication system according to the embodiment. FIG. 17(A) and FIG. 18(B) are explanatory diagrams describing the operation sequence 3 of the mobile communication system according to the embodiment.

In the above-described operation sequence 1, the eNB 200-2 determines whether or not the UE 100-1 connected to the cell 1 is connectable to the cell 2. On the other hand, in the operation sequence 3, a network (network device) determines whether or not the UE 100-1 connected to the cell 1 is connectable to the cell 2.

In FIG. 16, step S301 corresponds to step S101.

In step S302, when the CSG ID 1 included in the ES request received from the eNB 200-1 and the CSG ID 2 of the cell 2 are different, the eNB 200-2 transmits, to the network (a network device such as MME, for example), a determination request to request to determine whether or not the UE 100-1 connected to the cell 1 is connectable to the cell 2. The network device receives the determination request. The determination request includes the CSG ID 1 and the CSG indication 1 included in the ES request received from the eNB 200-1, and the CSG ID 2 of the cell 2 and the CSG indication 2 of the cell 2.

In step S303, the network determines the relation on a CSG, in response to the determination request. Step S303, in which a determination similar to that in step S102 is performed, is different in the following points.

When the cell 1 and the cell 2 have the same CSG indication and have different CSG IDs, the network determines the relation on a CSG ID, on the basis of a setting situation of the white list of the UE 100. The network determines, on the basis of the relation on a CSG ID, whether or not the area compensation is possible by the extension of the cell 2 (that is, whether or not the UE 100-1 connected to the cell 1 is connectable to the cell 2).

Specifically, when the CSG ID 1 is set in the white list of the UE 100 connected at least to the cell 1 of the eNB 200-1, if the CSG ID 2 is (surely) set, then the network determines that the area compensation is possible.

Alternatively, when determining that a set A of UEs 100-1 connected at least to the cell 1 of the eNB 200-1 is a subset of a set B of UEs 100 having an access right to the cell 2 of the eNB 200-2 (that is, A⊆B), the network determines that the area compensation is possible.

A case of the determination will be specifically described, below.

(a) When the CSG Indication Indicates "True"

As shown in FIG. 17(A), the CSG indication 1 of the cell 1 is true, and the CSG ID 1 of the cell 1 is A. The CSG indication 2 of the cell 2 is true, and the CSG ID 2 of the cell 2 is D.

Figure 17B:
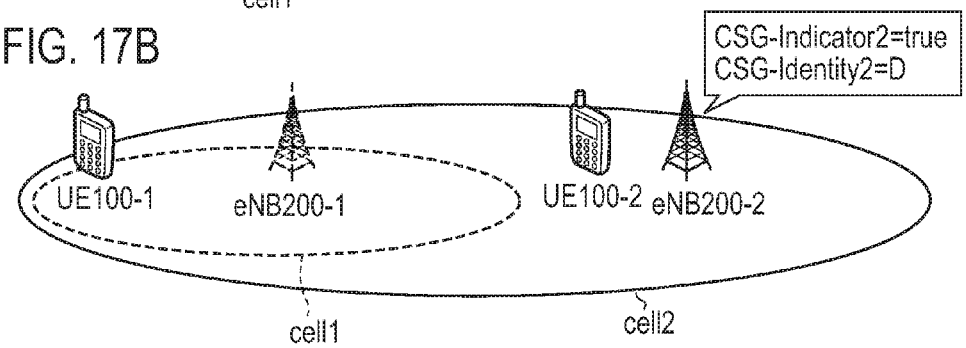

In this case, when it is determined that the area compensation is possible, and as shown in FIG. 17(B), if the eNB 200-2 performs the cell extension, then the network determines that the UE 100-1 connected to the cell 1 is connectable to the cell 2.

(a) When the CSG Indication Indicates "False"

Figure 18A:
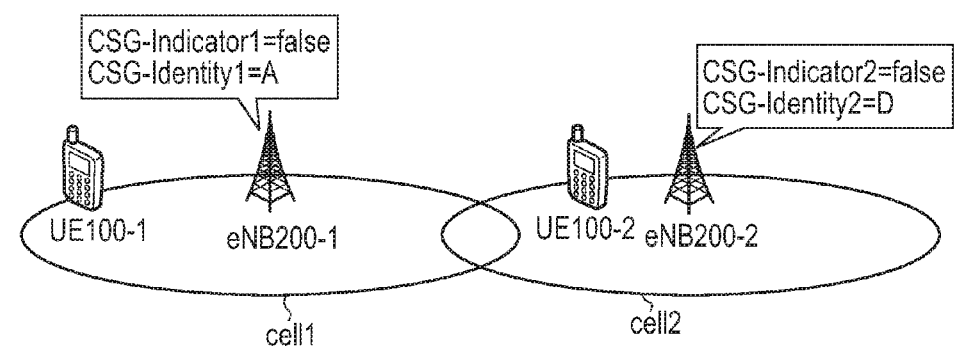
FIGS. 18(A) and 18(B) are explanatory diagrams describing the operation sequence 3 of the mobile communication system according to the embodiment.
Figure 18B:
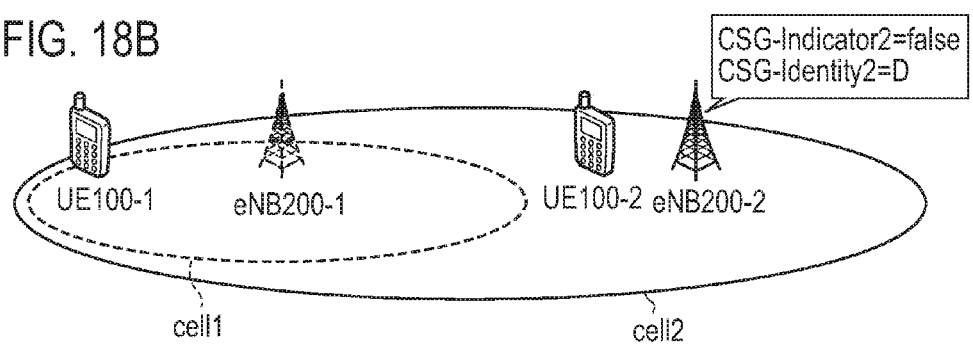

As shown in FIG. 18(A), the CSG indication 1 of the cell 1 is false, and the CSG ID 1 of the cell 1 is A. The CSG indication 2 of the cell 2 is false, and the CSG ID 2 of the cell 2 is D.

In this case, when it is determined that the area compensation is possible, and as shown in FIG. 18(B), if the eNB 200-2 performs the cell extension, then the network determines that the UE 100-1 connected to the cell 1 is connectable to the cell 2.

Now, description returns to FIG. 16. When the determination result is that the area compensation is possible (when the UE 100-1 connected to the cell 1 is connectable to the cell 2), the network performs a process of step S304. On the other hand, when the determination result is that the area compensation is not possible (when the UE 100-1 connected to the cell 1 is not connectable to the cell 2), the network performs a process of step S308.

In step S304, the network transmits, as a response to the determination request, a determination request response including the determination result indicating that the area compensation is possible. The eNB 200-2 receives the determination request response.

Steps S305 to S307 correspond to steps S103 to S105.

On the other hand, in step S308, the network transmits, as a response to the determination request, a determination request response including the determination result indicating that the area compensation is not possible. The eNB 200-2 receives the determination request response.

Step S309 corresponds to step S106.

(Summary of Embodiment)

In the embodiment, the eNB 200-1 sends an ES request to the eNB 200-2. An ES request response based on the determination result as to whether the UE 100-1 connected to the cell 1 of the eNB 200-1 is connectable to the cell 2 of the eNB 200-2 is transmitted to the eNB 200-1. Further, the eNB 200-1 decides whether or not to turn off the cell 1 on the basis of the response. Thus, when the UE 100-1 connected to the cell 1 is connectable to the cell 2, the eNB 200-1 is capable of turning off the cell 1, and when the UE 100-1 connected to the cell 1 is not connectable to the cell 2, the eNB 200-1 is capable of cancelling to turn off the cell 1, and thus, it is possible to avoid a case where the UE 100-1 becomes not capable of making communication, which is caused as a result of the cell 1 being turning off. Therefore, it is possible to suppress a decrease of a communication quality and to realize energy saving.

In the embodiment, when not setting the closed mode to the cell 2, the eNB 200-2 transmits an ES response with an indication of approving the cell extension. Thus, the UE 100-1 connected to the cell 1 is connectable to the cell 2 to which the closed mode is set, and thus, it is possible to avoid a case where the UE 100-1 becomes not capable of making communication, which is caused as a result of the cell 1 being turned off.

In the embodiment, the cell 1 is a cell to which the closed mode is settable. The eNB 200-1 transmits the ES request including the CSG ID 1 of the cell 1. When the closed mode is set to the cell 2 and when the CSG ID 1 of the cell 1 and the CSG ID 2 of the cell 2 are the same, the eNB 200-2 transmits the response with an indication of approving the cell extension. Thus, when the CSG ID 1 of the cell 1 and the CSG ID 2 of the cell 2 are the same, the UE 100-1 having the CSG ID 1 of the cell 1 is connectable to the cell 2, and thus, it is possible to avoid a case where the UE 100-1 becomes not capable of making communication, which is caused as a result of the cell 1 being turning off.

In the embodiment, the eNB 200-1 transmits the ES request to each of the plurality of eNBs 200. When receiving an ES request response with an indication of approving the cell extension from each of the plurality of eNBs 200, the eNB 200-1 decides to cause each of eNBs 200 in a combination where the power consumption based on the cell extension is the smallest, out of two or more eNBs 200, to perform the cell extension. Thus, it is possible to minimize the power consumption based on the cell extension.

In the embodiment, the eNB 200-1 transmits the ES request including the CSG ID 1 of the cell 1. When the CSG ID 1 and the CSG ID 2 are different, the eNB 200-2 transmits the determination request including the CSG ID 1 and the CSG ID 2, to the network. The network determines on the basis of the CSG ID 1 and the CSG ID 2 whether or not the UE 100-1 connected to the cell 1 is connectable to the cell 2. The eNB 200-2 transmits, on the basis of the determination result, the ES request response to the eNB 200-1. Thus, even when the CSG ID 1 and the CSG ID 2 are different, it is possible to determine that the UE 100-1 connected to the cell 1 is connectable, and thus, it is possible to avoid a case where the UE 100-1 becomes not capable of making communication, which is caused as a result of the cell 1 being turning off.

In the embodiment, when the CSG ID 2 is set in a list in which the CSG ID of a cell to which a UE 100 has an access right is set, if the CSG ID 1 is set, the network determines that the UE 100-1 connected to the cell 1 is connectable. Further, when determining that the set A including UEs 100-1 having an access right to the cell 1 is a subset of the set B of UEs 100 having an access right to the cell 2, the network determines that the UE 100-1 connected to the cell 1 is connectable. Thus, even when the CSG ID 1 and the CSG ID 2 are different, the network is capable of determining that the UE 100-1 connected to the cell 1 is connectable.

Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, in the above-described embodiment, in the operation pattern 3, the CSG ID 1 included in the ES request received from the eNB 200-1 and the CSG ID 2 of the cell 2 are different, the eNB 200-2 transmits the determination request to the network; however, this is not limiting. When receiving the ES request, the eNB 200-2 may transmit the determination request to the network. Alternatively, when the cell 2 is not set to the open mode, the eNB 200-2 may transmit the determination request to the network.

Further, in the above-described embodiment, the operation sequences 1 to 3 may be combined and executed, where necessary.

In addition, the aforementioned embodiment has described an example in which the present invention is applied to the LTE system. However, the present invention is not limited to the LTE system, and may also be applied to systems other than the LTE system.

It is noted that the entire content of Japanese Patent Application No. 2013-244258 (filed on Nov. 26, 2013) is incorporated in the present specification by reference.

INDUSTRIAL APPLICABILITY

According to the embodiment-based communication control method and base station, when a neighboring cell is a cell to which the closed mode in which only a user terminal having an access right is accessible is settable, it is possible to realize energy saving while suppressing a decrease in communication quality.

The invention claimed is:

1. A communication control method used in a mobile communication system having an off target base station that intends to turn off a first cell that is an own cell of the off target base station and an extension target base station to perform cell extension for compensating the first cell, the method comprising:
a step A of requesting, by the off target base station, the extension target base station that manages a second cell to which a closed mode in which only a user terminal having an access right is accessible is settable to perform the cell extension, the request including a CSG (Closed Subscriber Group) identifier indication of the access right; and
a step B of transmitting, by the extension target base station, a response to the request that is used to turn off the first cell, based on a determination result that a user terminal connected to the first cell is connectable to the second cell, to the off target base station, according to the CSG identifier indication.

2. The communication control method according to claim 1, further comprising: a step of deciding, by the off target base station, on the basis of the response, whether or not to turn off the first cell.

3. The communication control method according to claim 1, wherein in the step B, the extension target base station transmits, when the closed mode is not set to the second cell, the response with an indication of approving the cell extension.

4. The communication control method according to claim 1, wherein the first cell is a cell to which the closed mode is settable,
in the step A, the off target base station transmits the request including a CSG identifier of the first cell, and
in the step B, the extension target base station transmits, when the closed mode is set to the second cell and when a CSG identifier of the first cell and a CSG identifier of the second cell are the same, the response with an indication of approving the cell extension.

5. The communication control method according to claim 2, wherein in the step A, the off target base station transmits the request to each of a plurality of extension target base stations including the extension target base station, and
the method further comprises: a step of deciding to cause, by the off target base station, when receiving the response with an indication of approving the cell extension from each of two or more extension target base stations out of the plurality of extension target base stations, each of extension target base stations in a combination where a power consumption based on the cell extension is the smallest, out of the two or more extension target base stations to perform the cell extension.

6. The communication control method according to claim 2, wherein the first cell is a cell to which the closed mode is settable,
in the step A, the off target base station transmits the request including a CSG identifier of the first cell, the method further comprises:
a step of transmitting, by the extension target base station, a CSG identifier of the first cell and a CSG identifier of the second cell to a network device, when the CSG identifier of the first cell and the CSG identifier of the second cell are different; and
a step C of determining, by the network device, on the basis of the CSG identifier of the first cell and the CSG identifier of the second cell, whether or not the user terminal connected to the first cell is connectable to the second cell, and
in the step B, the extension target base station transmits, on the basis of a determination result in the step C, the response, to the off target base station.

7. The communication control method according to claim 6, wherein in the step C, when a CSG identifier of the second cell is set in a list in which a CSG identifier of a cell to which the user terminal has an access right is set, if a CSG identifier of the first cell is set, then the network device determines that the user terminal connected to the first cell is connectable to the second cell.

8. The communication control method according to claim 6, wherein in the step C, the network device determines, when determining that a set of user terminals having an access right to the first cell is a subset of a set of user terminals having an access right to the second cell, that the user terminal connected to the first cell is connectable to the second cell.

9. A base station that corresponds to an off target base station in a mobile communication system having the off target base station that intends to turn off a first cell that is an own cell of the off target base station and an extension target base station to perform cell extension for compensating the first cell, the base station comprising:
 a transmitter configured to transmit request information to request, to the extension target base station that manages a second cell to which a closed mode in which only a user terminal having an access right is accessible is settable, to perform the cell extension, the request information including a CSG (Closed Subscriber Group) identifier indication of the access right; and
 a receiver configured to receive, from the extension target base station, a response to the request information that is used to turn off the first cell, based on a determination result that the user terminal connected to the first cell is connectable to the second cell, according to the CSG identifier indication.

10. A base station that corresponds to an extension target base station in a mobile communication system having an off target base station that intends to turn off a first cell that is an own cell of the off target base station and the extension target base station to perform cell extension for compensating the first cell, the base station comprising:
 a controller configured to manage a second cell to which a closed mode in which only a user terminal having an access right is accessible is settable;
 a receiver configured to receive, from the off target base station, request information to request for performing the cell extension, the request information including a CSG (Closed Subscriber Group) identifier indication of the access right; and
 a transmitter configured to transmit, to the off target base station, a response to the request information that is used to turn off the first cell, based on a determination result that the user terminal connected to the first cell is connectable to the second cell, according to the CSG identifier indication.

\* \* \* \* \*